US007146059B1

(12) United States Patent
Durand et al.

(10) Patent No.: US 7,146,059 B1
(45) Date of Patent: Dec. 5, 2006

(54) METHOD OF PERFORMING FAST BILATERAL FILTERING AND USING THE SAME FOR THE DISPLAY OF HIGH-DYNAMIC-RANGE IMAGES

(75) Inventors: Frédéric Durand, Boston, MA (US); Julie Dorsey, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 706 days.

(21) Appl. No.: 10/382,174

(22) Filed: Mar. 5, 2003

(51) Int. Cl.
G06K 9/40 (2006.01)
G09G 5/00 (2006.01)
G06K 9/36 (2006.01)

(52) U.S. Cl. .................. 382/260; 382/274; 345/617
(58) Field of Classification Search ........ 382/260–264, 382/266, 274, 254; 358/447; 345/611, 617
See application file for complete search history.

(56) References Cited

U.S. PATENT DOCUMENTS 5,471,987 A    12/1995  Nakazawa et al.
6,956,582 B1 * 10/2005  Tidwell .................. 345/611
7,002,589 B1 *  2/2006  Deering ................. 345/581

OTHER PUBLICATIONS

Frédéric Durand and Julie Dorsey, "Fast Bilateral Filtering for the Display of High-Dynamic-Range Images", ACM Siggraph, ACM Transactions on Graphics, pp. 257-266, Jul. 2002.

* cited by examiner

*Primary Examiner*—Yon J. Couso
(74) *Attorney, Agent, or Firm*—Daly, Crowley, Mofford, & Durkee, LLP (57) ABSTRACT

A method of performing bilateral filtering and using the method for displaying high-dynamic-range images is presented. The method reduces the contrast of the image while preserving detail of the image. The presently disclosed method incorporates a two-scale decomposition of the image into a base layer encoding large-scale variations, and a detail layer. The base layer has its contrast reduced, thereby preserving detail. The base layer is obtained using an edge-preserving bilateral filter. The bilateral filter is a non-linear filter, where the weight of each pixel is computed using a Gaussian in the spatial domain multiplied by an influence function in the intensity domain that decreases the weight of pixels with large intensity differences. The bilateral filtering is accelerated by using a piecewise-linear approximation in the intensity domain and appropriate subsampling.

29 Claims, 5 Drawing Sheets

METHOD OF PERFORMING FAST BILATERAL FILTERING AND USING THE SAME FOR THE DISPLAY OF HIGH-DYNAMIC-RANGE IMAGES

STATEMENT REGARDING FEDERALLY SPONSORED RESEARCH

This invention was made with government support under Grant Nos. CCR-0072690 and EIA-9802220 awarded by NSF. The government has certain rights in the invention.

CROSS REFERENCE TO RELATED APPLICATIONS

Not Applicable.

FIELD OF THE INVENTION

The present invention relates generally to image processing, and more specifically to a method of performing fast bilateral filtering for performing contrast reduction for the display of high-dynamic images.

BACKGROUND OF THE INVENTION

There is a tremendous need for contrast reduction in applications such as image-processing, medical imaging, realistic rendering, and digital photography. For example, in photography a major aspect of the art and craft concerns the management of contrast via multiple means e.g. exposure, lighting, printing, or local dodging and burning. Poor management of light-under or over-exposed areas, light behind the main character, etc.—is the single most-commonly cited reason for rejecting photographs. This is one reason why camera manufacturers have developed sophisticated exposure-metering systems. Unfortunately, exposure only operates via global contrast management—that is, it recenters the intensity window on the most relevant range. If the range of intensity is too large, the photo will contain underexposed and overexposed areas.

It would, therefore, be desirable to provide a method which reduces the contrast of an image while maintaining the detail of the image such that high-dynamic-range images can be presented.

SUMMARY OF THE INVENTION

A method for performing bilateral filtering and fro using the bilateral filtering method for displaying high-dynamic-range images is presented. The method reduces the contrast of the image while preserving detail of the image. The presently disclosed method incorporates a two-scale decomposition of the image into a base layer encoding large-scale variations, and a detail layer. The base layer has its contrast reduced, thereby preserving detail. The base layer is obtained using an edge-preserving bilateral filter. The bilateral filter is a non-linear filter, where the weight of each pixel is computed using a Gaussian in the spatial domain multiplied by an influence function in the intensity domain that decreases the weight of pixels with large intensity differences. The bilateral filtering is accelerated by using a piecewise-linear approximation in the intensity domain and appropriate subsampling.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
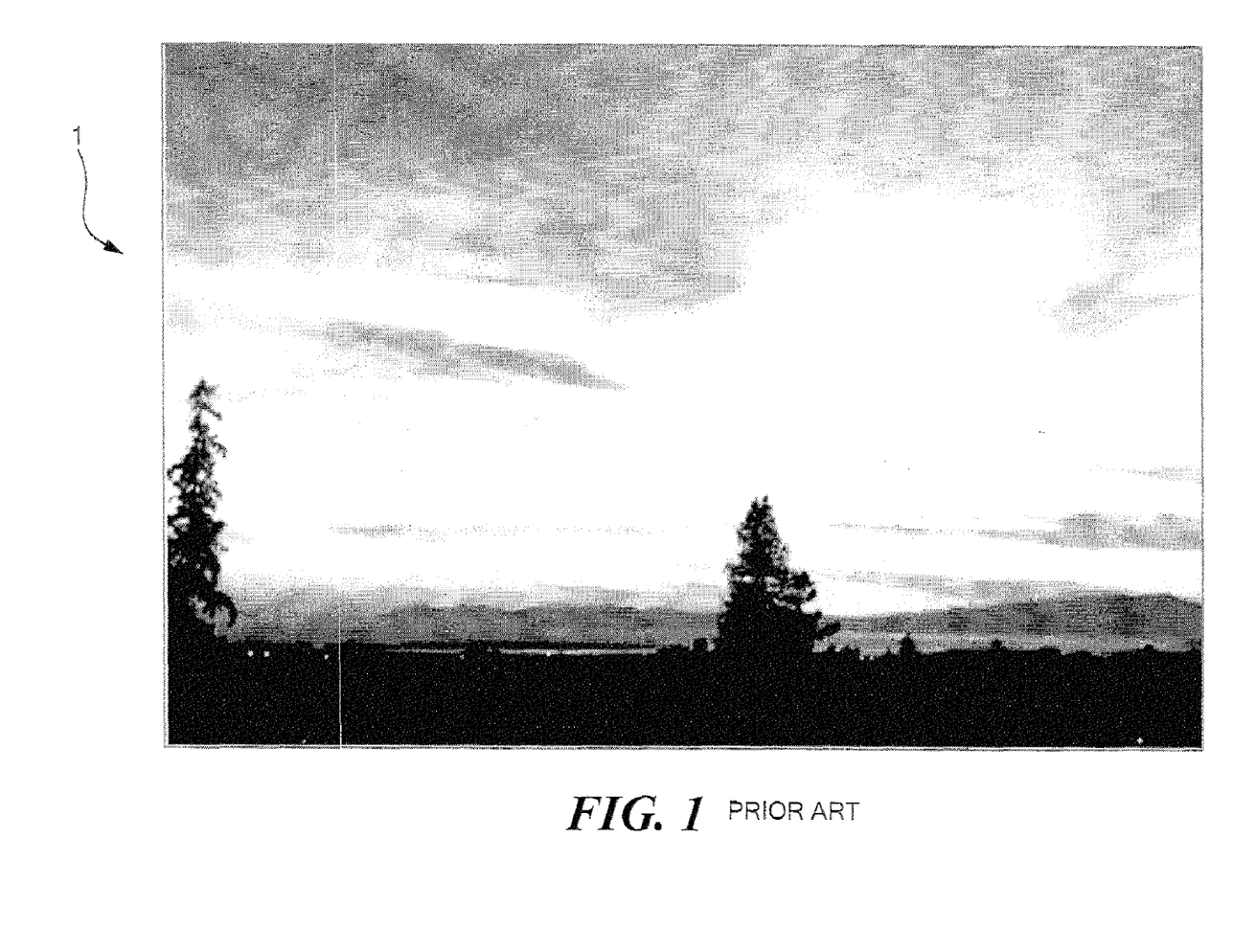
FIG. 1 is an image of a sunset scene having underexposed and overexposed portions.

FIG. 1 shows an example of an image 1 wherein the sun is overexposed and the foreground is underexposed, therefore there is too much contrast in the image. This image is undesirable due to the underexposed and overexposed portions. There are several methodologies known in the art for reducing contrast, however each of these known methodologies for reducing contrast has certain drawbacks associated with them.

One method of providing contrast reduction is known as local tone mapping. Tone mapping operators are classified into global and local techniques. Because these techniques use the same mapping function for all pixels, most global techniques do not directly address contrast reduction. A limited solution uses S-shaped functions inspired from photography, thus preserving some details in the highlights and shadows. Unfortunately, contrast is severely reduced in these areas. Some have proposed interactively varying the mapping according to the region of interest attended by the user, and further using graphics hardware to accomplish this.

Another method for reducing contrast for the display of high dynamic images uses global histogram adjustment which disregards the empty portions of the histogram, thereby resulting in efficient contrast reduction. However, the limitations due to the global nature of the technique become obvious when the input exhibits a uniform.

In contrast to global tone mapping operators, local tone mapping operators use a mapping that varies spatially depending on the neighborhood of a pixel. This exploits the fact that human vision is sensitive mainly to local contrast.

Figure 2:
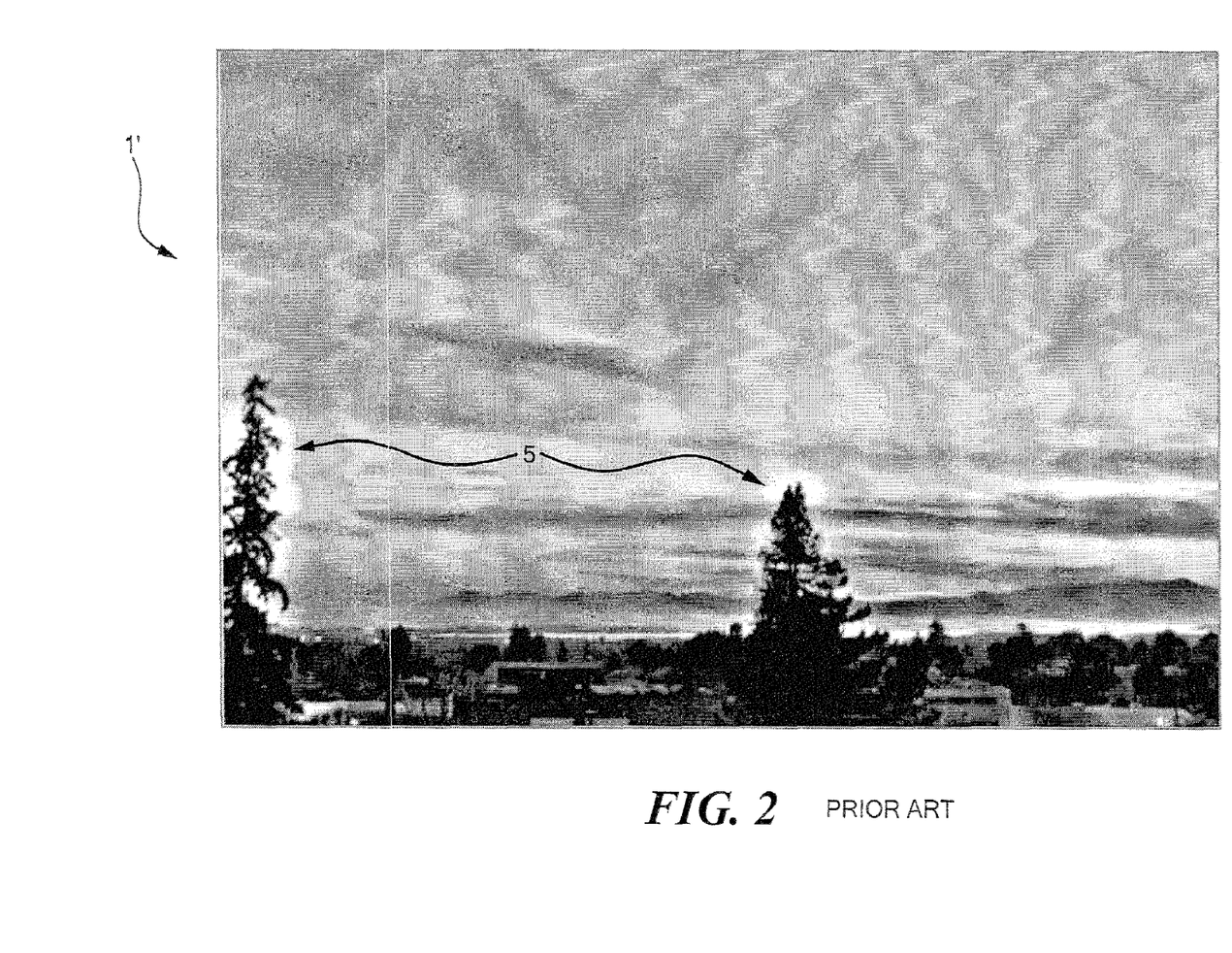
FIG. 2 is the image of FIG. 1 having a tone mapping technique applied.
Figure 3:
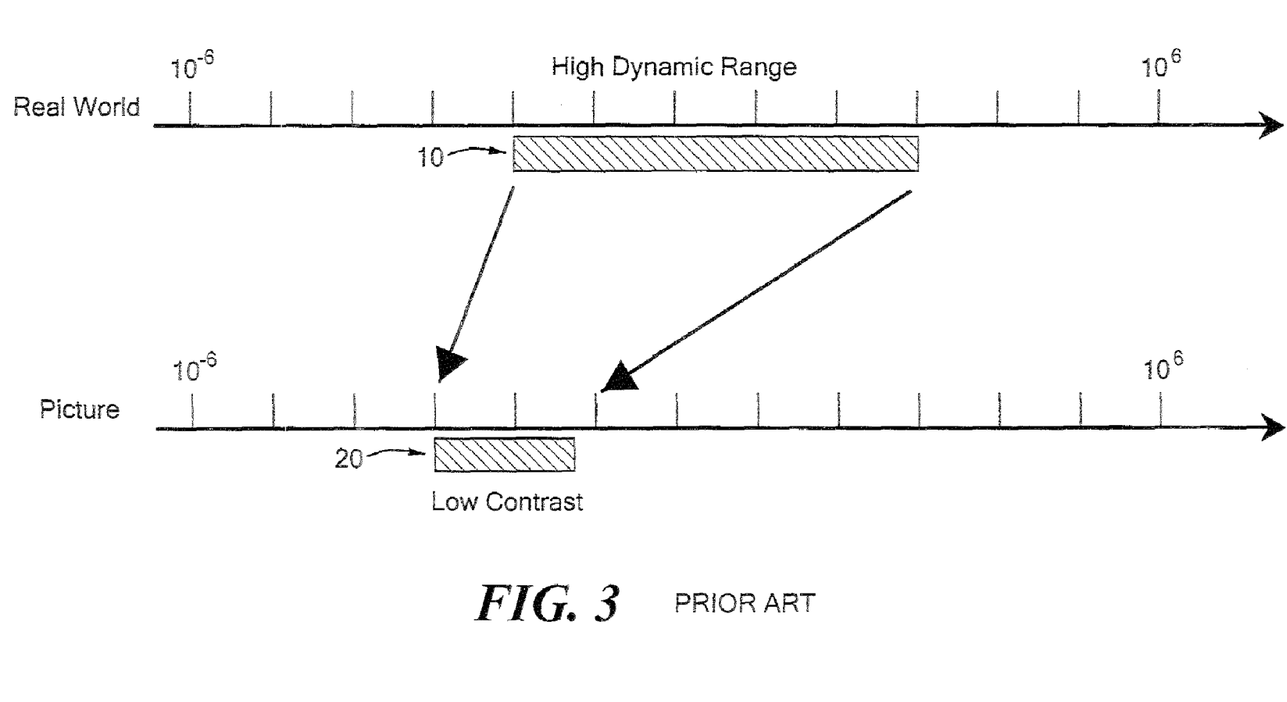
FIG. 3 is a graph showing real world high dynamic range contrasts as compared to a low contrast image.

Most local tone-mapping techniques use a decomposition of the image into different layers or scales. The contrast is reduced differently for each scale, and the final image is a recomposition of the various scales after contrast reduction. The major pitfall of local methods is the presence of haloing artifacts. This is shown in FIG. 2, wherein the image 1 of FIG. 1 has had a local tone mapping technique applied to it, resulting in image 1'. As can be seen in image 1', several halos 5 are present. When dealing with high-dynamic-range images, haloing issues become even more critical. In 8-bit images, the contrast at the edges is limited to roughly two orders of magnitude, which directly limits the strength of halos.

Another technique varies gain according to a low-pass version of the image which results in pronounced halos. Other techniques experience similar problems when they tried to vary the mapping spatially. Still other techniques have reduced halos by applying a similar technique at multiple scales. Yet another technique uses a multiscale decomposition of the image according to comprehensive psychophysically-derived filter banks. To date, this method seems to be the most faithful to human vision, however, it may still present halos.

Still another technique for performing contrast reduction on high dynamic images utilizes an operator for synthetic images that takes advantage of the ability of the human visual system to decompose a scene into intrinsic layers, such as reflectance and illumination. Because vision is sensitive mainly to the reflectance layers, the technique reduces contrast only in the illumination layer. This technique is unfortunately applicable only when the characteristics of the 3D scene are known.

Another important aspect of reducing contrast is to incorporate edge-preserving smoothing techniques. One such technique is known as anisotropic diffusion and was inspired by an interpretation of Gaussian blur as a heat conduction partial differential equation (PDE):

$$\frac{\partial I}{\partial t} = -\Delta I.$$

That is, the intensity I of each pixel is seen as heat and is propagated over time to its four neighbors according to the heat spatial variation.

A recent method utilizes anisotropic diffusion to decompose an image using a new low-curvature image simplifier (LCIS). This method can extract exquisite details from high-contrast images. Unfortunately, the solution of the techniques partial differential equation is a slow iterative process. Moreover, the coefficients of their diffusion equation must he adapted to each image, which makes this method more difficult to use, and the extension to animated sequences unclear.

Although anisotropic diffusion is a popular tool for edge-preserving filtering, its discrete diffusion nature makes it a slow process. Moreover, the results depend on the stopping time of the diffusion, since the diffusion converges to a uniform image.

Bilateral filtering was developed as an alternative to anisotropic diffusion. It is a non-linear filter where the output is a weighted average of the input. They start with standard Gaussian filtering with a spatial kernel f. However, the weight of a pixel depends also on a function g in the intensity domain, which decreases the weight of pixels with large intensity differences. g is an edge-stopping function. The output of the bilateral filter for a pixel s is then:

$$J_s = \frac{1}{k(s)} \sum_{p \in \Omega} f(p-s) g(I_p - I_s) I_p \quad \text{Equation (1)}$$

where k(s) is a normalization term:

$$k(s) = \sum_{p \in \Omega} f(p-s) g(I_p - I_s) \quad \text{Equation (2)}$$

In practice, a Gaussian for f in the spatial domain, and a Gaussian for g in the intensity domain is used. Therefore, the value at a pixel s is influenced mainly by pixels that are close spatially and that have a similar intensity. This can extend to color images, and any metric g on pixels can be used.

As the availability of high-dynamic-range images grows due to advances in lighting simulation, multiple-exposure photography and new sensor technologies, there is a growing demand to be able to display these images on low-dynamic-range media. A human visual system can cope with such high-contrast scenes because most of the adaptation mechanisms are local on the retina.

The use of high-dynamic-range cameras and relevant display operators can address these issues associated with poor light management. Digital photography has inherited many of the strengths of film photography. However it also has the potential to overcome its limitations. Ideally, the photography process should be decomposed into a measurement phase (with a high-dynamic-range output), and a post-process phase that, among other things, manages the contrast. This post-process could be automatic or user-controlled, as part of the camera or on a computer, but it should take advantage of the wide range of available intensity to perform appropriate contrast reduction.

The presently disclosed method incorporates a fast and robust operator that takes a high-dynamic-range image as input, and compresses the contrast while preserving the details of the original image. The operator is based on a two-scale decomposition of the image into a base layer (large-scale features) and a detail layer. Only the base layer has its contrast reduced, thereby preserving the detail. In order to perform a fast decomposition into these two layers and to avoid halo artifacts, a fast and robust edge-preserving filter is utilized.

The present method includes an edge-preserving filter that blurs the small variations of a signal (noise or texture detail) but preserves the large discontinuities (edges). This application is unusual however, in that the noise (detail) is the important information in the signal and is therefore preserved.

Bilateral filtering using a non-linear filter is known by those of reasonable skill in the art. The filtering derives from Gaussian blur, but it prevents blurring across edges by decreasing the weight of pixels when the intensity difference is too large. As it is an alternative to the use of anisotropic diffusion, which has proven to he a valuable tool in a variety of areas of computer graphics, the potential applications of this technique extend beyond the scope of contrast reduction.

The present method recasts bilateral filtering in the framework of robust statistics, which is concerned with estimators that are insensitive to outliers. Bilateral filtering is an estimator that considers values across edges to be outliers. This allows a wide theoretical context to be provided for bilateral filtering, and to relate it to anisotropic diffusion.

Two techniques are used to provide for fast bilateral filtering. The first technique is to linearize bilateral filtering, which allows the use of a Fast Fourier Transform (FFT) and fast convolution. A second technique is to downsample the key operations.

The uncertainty of the output of the filter is computed, which permits the correction of doubtful values.

In order to establish a link to bilateral filtering, a different interpretation of discrete anisotropic filtering is presented. In anisotropic filtering, $I_p^t - I_s^t$ is used as the derivative of $I^t$ in one direction. However, this can also be seen simply as the 0-order difference between the two pixel intensities. The edge-stopping function can thus be seen as preventing diffusion between pixels with large intensity differences. The two formulations are equivalent from a practical standpoint, the 0-order interpretation is more natural in terms of robust statistics.

In particular, the 0-order anisotropic diffusion is extended to a larger spatial support:

$$I_s^{t+1} = I_s^t + \lambda \sum_{p \in \Omega} f(p-s) g(I_p^t - I_s^t)(I_p^t - I_s^t) \qquad \text{Equation (3)}$$

where f is a spatial weighting function (typically a Gaussian), $\Omega$ is the whole image, and t is still a discrete time variable. The anisotropic diffusion, which we now call local diffusion, corresponds to an f that is zero except at the four neighbors. Equation 3 defines a robust statistical estimator of the class of M-estimators (generalized maximum likelihood estimator).

In the case where the conductance g is uniform (isotropic filtering) and where f is a Gaussian, Equation 3 performs a Gaussian blur for each iteration, which is equivalent to several iterations of the heat-flow simulation. It can thus be seen as a way to trade the number of iterations for a larger spatial support. However, in the case of anisotropic diffusion, it has the additional property of propagating heat across edges. Indeed, if the image is white with a black line in the middle, local anisotropic diffusion does not propagate energy between the two connected components, while extended diffusion does. Depending on the application, this property will be either beneficial or deleterious. In the case of tone mapping, for example, the notion of connectedness is not important, as only spatial neighborhoods matter.

We now come to the robust statistical interpretation of bilateral filtering. Equation 1 defines an estimator based on a weighted average of the data. It is therefore a W-estimator. The iterative formulation is an instance of iteratively reweighted least squares. This taxonomy is extremely important because it was shown that M-estimators and W-estimators are essentially equivalent and solve the same energy minimization problem:

$$\min \sum_{s \in \Omega} \sum_{p \in \Omega} \rho(I_s - I_p) \qquad \text{Equation (4)}$$

or for each pixel s:

$$\sum_{p \in \Omega} \psi(I_s - I_p) = 0 \qquad \text{Equation (5)}$$

where $\psi$ is the derivative of $\rho$. For anisotropic diffusion, and as is true also for bilateral filtering, it suffices to define $\psi(x) = g(x) * x$ to find the original formulations. In fact the second edge-stopping function $g_2$ corresponds to the Gaussian influence function used for bilateral filtering. As a consequence of this unified viewpoint, all the studies on edge-stopping functions for anisotropic diffusion can be applied to bilateral filtering.

Eqs. 4 and 5 are not strictly equivalent because of local minima of the energy. Depending on the application, this can be desirable or undesirable. In the former case, the use of a very robust estimator, such as the median, to initialize an iterative process is recommended. In the case of tone mapping or texture-illuminance decoupling, however, we want to find the local minimum closest to the initial pixel value.

It was noted that bilateral filtering usually requires only one iteration. Hence it belongs to the class of one-step W-estimators, or w-estimators, which have been shown to be particularly efficient. The existence of local minima is however a very important issue, and the use of an initial median estimator is highly recommended.

Both 0-order anisotropic diffusion and bilateral filtering belong to the same family of estimators and both respect causality. No maximum or minimum can be created, only removed. However, anisotropic diffusion is adiabatic (energy-preserving), while bilateral filtering is not. To see this, consider the energy exchange between two pixels p and s. In the diffusion case, the energy $$\lambda f(p-s) g(I_p^t - I_s^t)(I_p^t - I_s^t) \qquad \text{Equation (6)}$$

flowing from p to s is the opposite of the energy from s to p because the expression is symmetric (provided that g and f are symmetric). In contrast, in bilateral filtering, the normalization factor 1/k is different for the two pixels, resulting in an asymmetric energy flow. Energy preservation can be crucial for some applications, but it is not for tone mapping or reflectance extraction.

In contrast to anisotropic diffusion, bilateral filtering does not rely on shock formation, so it is not prone to stairstepping artifacts. The output of bilateral filtering on a gradient input is smooth. This point is mostly due to the non-iterative nature of the filter.

When the influence function is monotonic, there is no local minimum problem, and estimators always converge to a global maximum. Most robust estimators have a shape wherein the function increases, then decreases, and potentially goes to zero if it has a finite rejection point.

The Huber minimax gives constant influence to outliers, and the Lorentz estimator gives them more importance than, say, the Gaussian estimator. The Tukey biweight is the only purely redescending function. Outliers are thus completely ignored.

The larger influences of outliers result in estimates that are more blurred and further from the input pixels. In what follows, the Gaussian or Tukey influence function are used, because they are more robust to outliers and better preserve edges.

A direct implementation of bilateral filtering might require $O(n^2)$ time, where n is the number of pixels in the image. In this section, bilateral filtering is accelerated using two strategies: a piecewise-linear approximation in the intensity domain, and a sub-sampling in the spatial domain. A technique is also presented that detects and fixes pixels where the bilateral filter cannot obtain a good estimate due to lack of data.

A convolution such as Gaussian filtering can be greatly accelerated using Fast Fourier Transform. A $O(n^2)$ convolution in the primal becomes a $O(n)$ multiplication in the frequency domain. Since the discrete FFT and its inverse have cost $O(n \log n)$, there is a gain of one order of magnitude.

Unfortunately, this strategy cannot be applied directly to bilateral filtering, because it is not a convolution: The filter is signal-dependent because of the edge-stopping function $g(I_p - I_s)$. However consider Equation 1 for a fixed pixel s. It is equivalent to the convolution of the function $H^{I_s}: p \to g(I_p - I_s) I_p$ by the kernel f. Similarly, the normalization factor k is the convolution of $G^{I_s}: p \to g(I_p - I_s)$ by f. That is, the only dependency on pixel s is the value $I_s$ in g.

The acceleration strategy is thus as follows: the set of possible signal intensities is discretized into NB_SEGMENT values $\{i^j\}$, and a linear filter is computed for each such value:

$$J_s^j = \frac{1}{k^j(s)} \sum_{p \in \Omega} f(p-s)g(I_p^t - I^j)I_p \qquad \text{Equation (7)}$$

$$= \frac{1}{k^j(s)} \sum_{p \in \Omega} f(p-s) H_p^j \qquad \text{Equation (8)}$$

$$k^j(s) = \sum_{p \in \Omega} f(p-s) g(I_p - i^j) \qquad \text{Equation (9)}$$

$$= \sum_{p \in \Omega} f(p-s) G^j(p) \qquad \text{Equation (10)}$$

The final output of the filter for a pixel s is then a linear interpolation between the output $J_s^j$ of the two closest values $i^j$ of $I_s$. This corresponds to a piecewise-linear approximation of the original bilateral filter (note however that it is a linearization of the whole functional, not of the influence function).

The speed-up obtained is dependent on the size of the spatial kernel. The piecewise-linear version outperforms the brute-force implementation, due to the use of FFT convolution. This is further accelerated when the distribution of intensities is not uniform spatially. The image is subdivided into sub-images, and if the difference between the max and min of the intensity is more reduced in the sub-images than the whole image, fewer segments can be used.

To further accelerate bilateral filtering, all operations except the final interpolation aim at low-pass filtering. A downsampled version of the image can be used with little quality loss. However, the final interpolation should be performed using the full-scale image, otherwise edges may not he respected, resulting in visible artifacts.

The nearest-neighbor downsampling is used, because it does not modify the histogram. No visible artifacts were noticed using a downsampling factor of 10 to 25. At this resolution, the cost of the upsampling and linear interpolation outweighs the filtering operations, and no further acceleration is gained by more aggressive downsampling.

Edge-preserving contrast reduction can still encounter small halo artifacts for antialiased edges or due to flare around high-contrast edges. These small halos correspond to pixels where there is not enough information in the neighborhood to decouple the large-scale and the small-scale features. Indeed, the values at the edges span the whole range between the upper and the lower values, and there are very few pixels in the zone of proper data of the influence function. A statistical estimator is computed with very little data, and the variance is quite high.

Fortunately, bilateral filtering provides a direct measure of this uncertainty. The normalization factor k in Equation 1 is the sum of the influence of each pixel. This is used it to detect dubious pixels that need to be fixed. Alternately the log of this value is used because it better extracts uncertain pixels.

The fixing strategy is as follows. A low-pass version J of the output J of the bilateral filter, using a small Gaussian kernel (2 pixels in practice), and a value of a linear interpolation between J and f is assigned to the pixel depending on the log of the uncertainty k.

Bilateral filtering is used for contrast reduction. The present method is not strictly a tone reproduction operator since it does not attempt to imitate human vision.

The contrast reduction is based on a multiscale decomposition. However, only a two-scale decomposition is used, where the "base" image is computed using bilateral filtering, and the detail layer is the division of the input intensity by the base layer.

Figure 4:
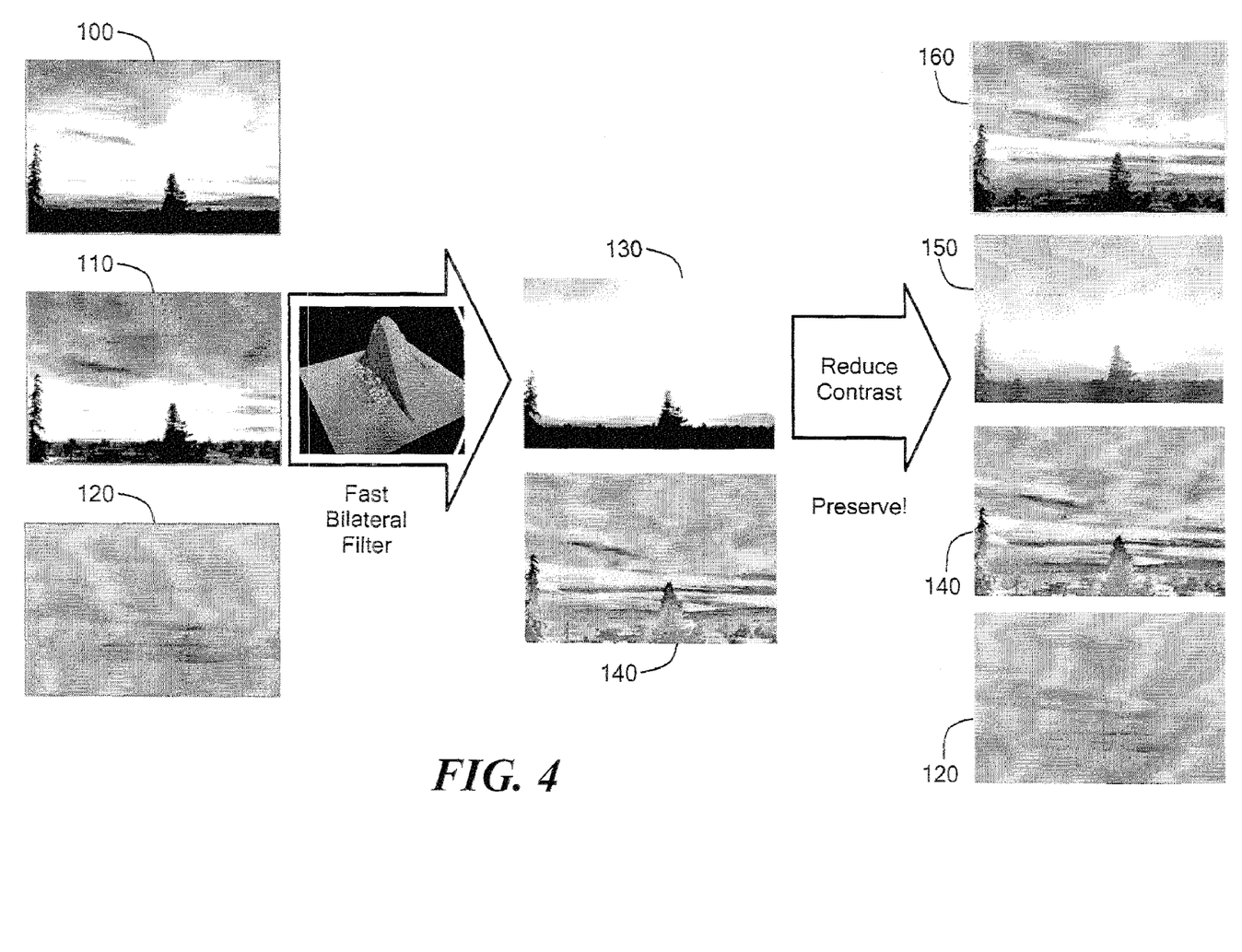
FIG. 4 shows an image at various points in the present method.

FIG. 4 illustrates the general approach. The original image is decomposed into an intensity layer 110 and a color layer 120. The intensity layer 110 is run through the bilateral filter described above, resulting in a base layer 130. The detail layer is provided by dividing the intensity layer 110 by the base layer 130. The base layer has its contrast reduced, while the magnitude of the detail layer is unchanged, thus preserving detail. The reduced contrast base layer 150, the detail layer 140, and the color layer are then recombined to provide the resulting reduced contrast image 160.

The range of the base layer is compressed using a scale factor in the log domain. This scale factor is computed such that the whole range of the base layer is compressed to a user-controllable base contrast. In practice, a base contrast of 5 worked well, but in some situations where lights sources are visible, one might want to vary this setting.

The treatment of color is simple. Contrast reduction is performed on the intensity of pixels and the color is recomposed after contrast reduction. Calculations are performed on the logs of pixel intensities, because pixel differences then correspond directly to contrast, and because it yields a more uniform treatment of the whole range.

The only user-controlled parameters of the present method are the overall brightness and the base contrast. While the automatic values perform very well, it may be useful to provide these intuitive degrees of freedom to allow the user a control over the "look" of the image. The base contrast provides a very intuitive alternative to the contrast/brightness setting of image-editing software. It controls the overall appearance of the image, while still preserving the fine details.

The present technique can address some of the most challenging photographic situations, such as interior lighting or sunset photos, and produces very compelling images.

Figure 5:
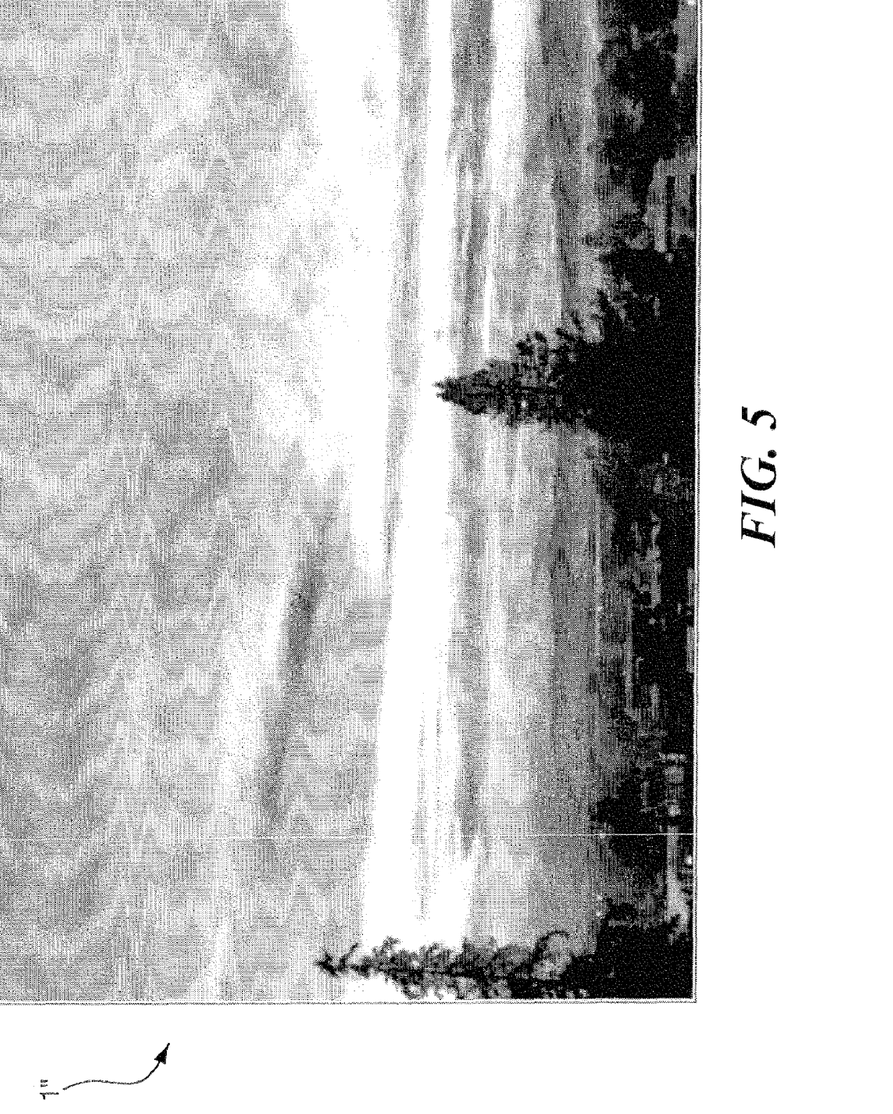
FIG. 5 shows the resulting image having reduced contrast in accordance with the present invention.

As shown in FIG. 5, the resulting image 1" is much more desirable than the original image 1 in FIG. 1. Image 1" has no overexposed or under exposed regions. The image further has no halo effects and provides a great amount of detail.

A method for performing bilateral filtering and for displaying high-dynamic-range images has been described. The method reduces the contrast of the image while preserving detail of the image. The presently disclosed method incorporates a two-scale decomposition of the image into a base layer encoding large-scale variations, and a detail layer. The base layer has its contrast reduced, thereby preserving detail. The base layer is obtained using an edge-preserving bilateral filter. The bilateral filter is a non-linear filter, where the weight of each pixel is computed using a Gaussian in the spatial domain multiplied by an influence function in the intensity domain that decreases the weight of pixels with large intensity differences. The bilateral filtering is accelerated by using a piecewise-linear approximation in the intensity domain and appropriate subsampling.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A method of performing piece-wise linear bilateral filtering comprising:
   computing a weight of each of a plurality of pixels of an image using a Gaussian in a spatial domain; and
   multiplying said weight by an influence function in the intensity domain wherein a weight of a pixel with a large intensity difference from weights of other pixels of said plurality of pixels is reduced.

2. The method of claim 1 wherein said computing and said multiplying are done in accordance with the formula:

$$J_s = \frac{1}{k(s)} \sum_{p \in \Omega} f(p-s)g(I_p - I_s)I_p$$

wherein $J_s$ is the output for pixel s, k(s) is a normalization term, f is the Gaussian in the spatial domain, g is the Guassian in the intensity domain, $I_p$ is the intensity for the image, and $I_s$ is the intensity for the pixel.

3. The method of claim 2 where k(s) is determined in accordance with the formula:

$$k(s) = \sum_{p \in \Omega} f(p-s)g(I_p - I_s)$$

where f is the Gaussian in the spatial domain, g is the Guassian in the intensity domain, $I_p$ is the intensity for the image, and $I_s$ is the intensity for the pixel.

4. The method of claim 1 wherein said multiplying comprises utilizing a piecewise-linear approximation in the intensity domain.

5. The method of claim 1 wherein said piecewise-linear approximation comprises discretizing a set of signal intensities into segment values and computing a linear filter for each said segment value.

6. The method of claim 5 wherein said computing includes utilizing a Fast Fourier Transform(FFT).

7. The method of claim 1 wherein said computing comprises down-sampling in the spatial domain.

8. The method of claim 7 wherein said down-sampling is done in accordance with the formula:

$$J_s^j = \frac{1}{k^j(s)} \sum_{p \in \Omega} f(p-s)g(I_p^t - I^j)I_p$$

$$= \frac{1}{k^j(s)} \sum_{p \in \Omega} f(p-s)H_p^j$$

wherein the final output of the filter for a pixel s is then a linear interpolation between the output $J_s^j$ of the two closest values $i^j$ of $I_s$.

9. The method of claim 8 wherein $$k^j(s) = \sum_{p \in \Omega} f(p-s)g(I_p - i^j)$$

$$= \sum_{p \in \Omega} f(p-s)G^j(p).$$

10. The method of claim 9 wherein said down-sampling comprises dividing said image in sub-images and when a difference between a maximum intensity and a minimum intensity is more reduced in said sub-image than said image then using fewer segments for said sub-images.

11. The method of claim 10 wherein said down-sampled version of said image is obtained using nearest-neighbor down-sampling.

12. The method of claim 11 wherein the output of the linear filters on said down-sampled image are linearly recombined at the full resolution.

13. The method of claim 1 further comprising detecting dubious pixels and fixing said dubious pixels.

14. The method of claim 13 wherein said fixing comprises:
   providing a low-pass version of the output of the bilateral filter; and
   assigning a value of a linear interpretation to the pixel depending on the log of the uncertainty normalization value.

15. A method for reducing contrast while preserving detail comprising:
   selecting a high dynamic range digital image;
   decomposing said image into an intensity layer and a color layer;
   running said intensity layer through a bilateral filter to obtain a base layer;
   dividing said intensity layer by said base layer to obtain a detail layer;
   reducing contrast in said base layer; and
   recombining said base layer having reduced contrast with said detail layer and said color layer to obtain a reduced contrast image.

16. The method of claim 15 wherein said running said intensity layer through a bilateral filter comprises:
   computing a weight of each of a plurality of pixels of an image using a Gaussian in a spatial domain; and
   multiplying said weight by an influence function in the intensity domain wherein a weight of a pixel with a large intensity difference from weights of other pixels of said plurality of pixels is reduced.

17. The method of claim 16 wherein said computing and said multiplying are done in accordance with the formula:

$$J_s = \frac{1}{k(s)} \sum_{p \in \Omega} f(p-s)g(I_p - I_s)I_p$$

wherein $J_s$ is the output for pixel s, k(s) is a normalization term, f is the Gaussian in the spatial domain, g is the Guassian in the intensity domain, $I_p$ is the intensity for the image, and $I_s$ is the intensity for the pixel.

18. The method of claim 17 where k(s) is determined in accordance with the formula:

$$k(s) = \sum_{p \in \Omega} f(p-s)g(I_p - I_s)$$

where f is the Gaussian in the spatial domain, g is the Guassian in the intensity domain, $I_p$ is the intensity for the image, and $I_s$ is the intensity for the pixel.

19. The method of claim 16 wherein said computing includes utilizing a Fast Fourier Transform (FFT).

20. The method of claim 16 wherein said multiplying comprises utilizing a piecewise-linear approximation in the intensity domain.

21. The method of claim 16 wherein said computing comprises sub-sampling in the spatial domain.

22. The method of claim 16 wherein said sub-sampling comprises discretizing a set of signal intensities into segment values and computing a linear filter for each said segment value.

23. The method of claim 21 wherein said sub-sampling is done in accordance with the formula:

$$J_s^j = \frac{1}{k^j(s)} \sum_{p \in \Omega} f(p-s)g(I_p^t - I^j)I_p$$

$$= \frac{1}{k^j(s)} \sum_{p \in \Omega} f(p-s)H_p^j$$

wherein the final output of the filter for a pixel s is then a linear interpolation between the output $J_s^j$ of the two closest values $i^j$ of $I_s$.

24. The method of claim 23 wherein $$k^j(s) = \sum_{p \in \Omega} f(p-s)g(I_p - i^j)$$

$$= \sum_{p \in \Omega} f(p-s)G^j(p).$$

25. The method of claim 24 wherein said sub-sampling comprises dividing said image in sub-images and when a difference between a maximum intensity and a minimum intensity is more reduced in said sub-image than said image then using fewer segments for said sub-images.

26. The method of claim 16 wherein said computing is done using a down-sampled version of said image.

27. The method of claim 26 wherein said down-sampled version of said image is obtained using nearest-neighbor down-sampling.

28. The method of claim 16 further comprising detecting dubious pixels and fixing said dubious pixels using a normalization factor.

29. The method of claim 28 wherein said fixing comprises:

providing a low-pass version of the output of the bilateral filter; and assigning a value of a linear interpretation to the pixel depending on the log of the uncertainty normalization value.

* * * * *

UNITED STATES PATENT AND TRADEMARK OFFICE
CERTIFICATE OF CORRECTION

PATENT NO. : 7,146,059 B1  Page 1 of 1
APPLICATION NO. : 10/382174
DATED : December 5, 2006
INVENTOR(S) : Durand et al.

It is certified that error appears in the above-identified patent and that said Letters Patent is hereby corrected as shown below:

Column 1, line 52 delete "and fro using" and replace with --and for using--.

Column 6, line 40 delete "function are used," and replace with --functions are used,--.

Column 6, line 61 delete "However consider" and replace with --However, consider--.

Column 7, line 36 delete "not he respected," and replace with --not be respected,--.

Column 8, line 20 delete "lights sources" and replace with --light sources--.

Column 8, line 42 delete "under exposed" and replace with --underexposed--.

Column 8, lines 59-60 delete "invention it will" and replace with --invention, it will--.

Column 9, line 5 delete "submitted that that the" and replace with --submitted that the--.

Signed and Sealed this

First Day of April, 2008

JON W. DUDAS
*Director of the United States Patent and Trademark Office*